Sept. 13, 1949.　　　　F. INGEMARSON　　　　2,481,514
PIPE BENDING MACHINE

Filed July 15, 1946　　　　　　　　　　　4 Sheets-Sheet 1

INVENTOR.
Franc Ingemarson
BY
George Y. Thorpe Atty.

Sept. 13, 1949.  F. INGEMARSON  2,481,514
PIPE BENDING MACHINE
Filed July 15, 1946  4 Sheets-Sheet 2
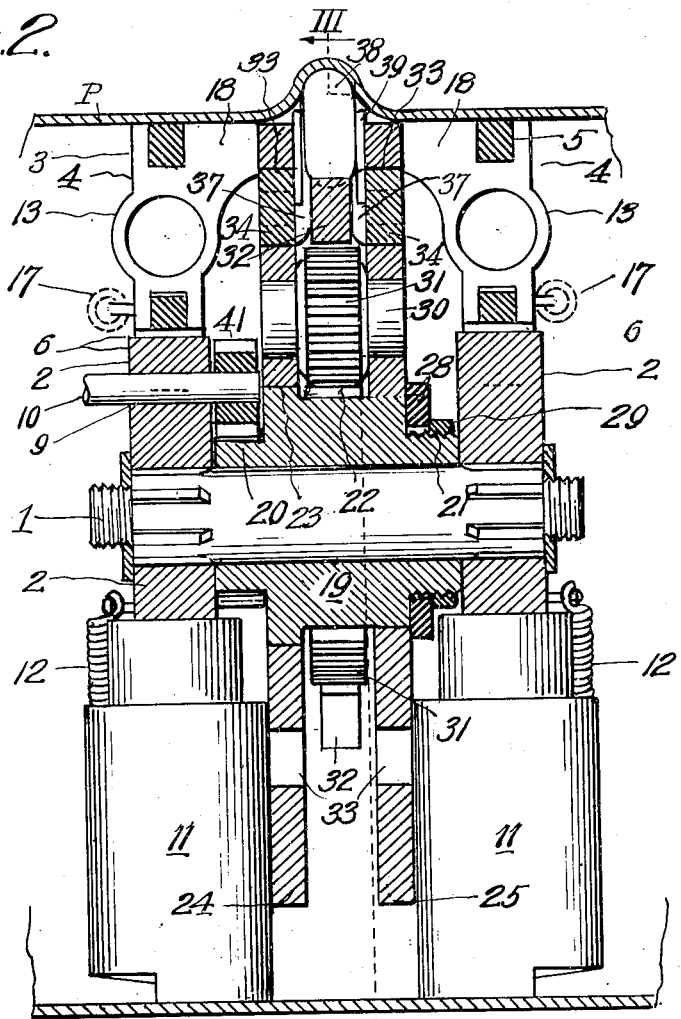
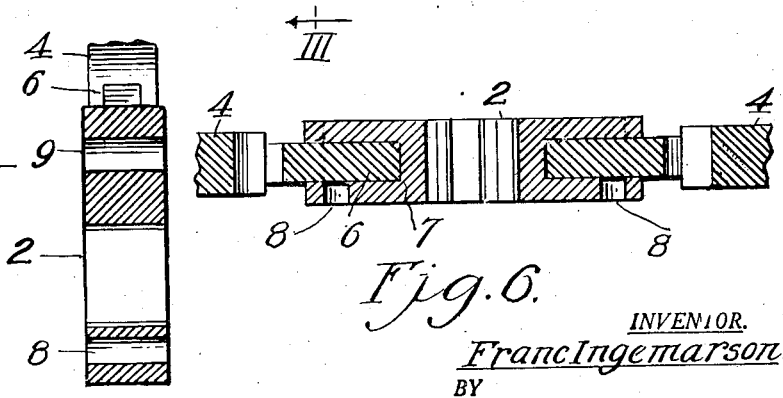
INVENTOR.
Franc Ingemarson
BY
George Thorpe
atty.

Sept. 13, 1949.  F. INGEMARSON  2,481,514
PIPE BENDING MACHINE
Filed July 15, 1946  4 Sheets-Sheet 3

INVENTOR.
Franc Ingemarson
BY George I. Thorpe
Atty

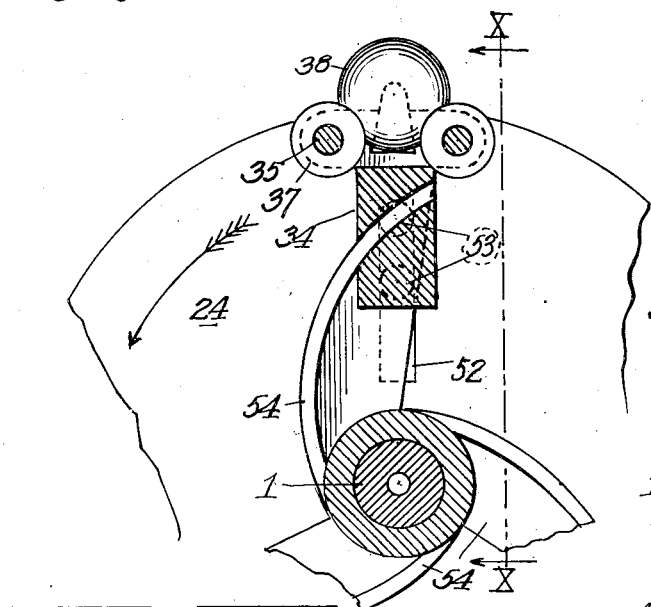
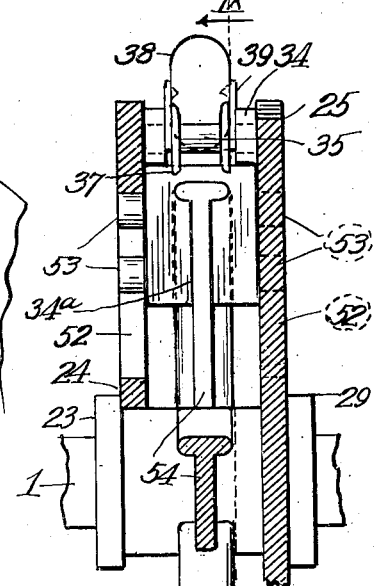
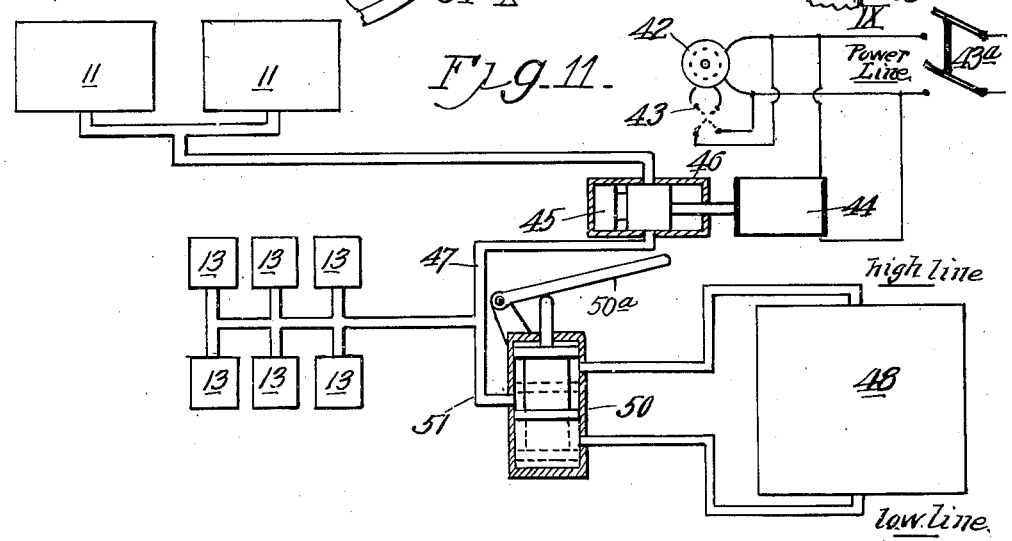

Patented Sept. 13, 1949

2,481,514

UNITED STATES PATENT OFFICE 2,481,514

PIPE-BENDING MACHINE

Franc Ingemarson, Tulsa, Okla., assignor of one-third to O. L. Carter and one-third to Albert Thompson, both of Tulsa, Okla.

Application July 15, 1946, Serial No. 683,630

10 Claims. (Cl. 153—69.5)

This invention relates to pipe bending machines and one object is to produce a machine of readily portable type for automatic formation of pipe bends in gas and oil pipe line field work, of that class which will effect the cold bending of the pipe by shortening one side thereof by the formation of an outwardly extending bead or wrinkle in substantially one-half of the circumference of the pipe, such bead starting at 0° in the circumference of the pipe, increasing in depth to a maximum at 90°, and then gradually reducing to zero depth at 180°.

The primary object of the invention is to provide a plurality of beading rollers rotating within the pipe in a path substantially equal in diameter to the I. D. of the pipe, the center of rotation of the series of rollers being gradually shifted radially under pressure in a straight line, with the result that an outward bead or wrinkle is formed having its maximum depth in line with the straight line movement of the axis of rotation.

The depth of the bead or wrinkle is, of course, determined by the extent or radius of the arc or angle to which the pipe is to be bent. In some cases where a substantial or relatively sharp bend is desired, it may be necessary to provide more than one bead in a pipe length where the desired angle cannot be produced by a single beading operation.

Another object of the invention is to provide a device of the character described which is readily operable by the usual power apparatus available in the field in pipe line laying work.

With the general objects named in view, and others as will hereinafter appear, the invention consists in certain novel and useful features of construction and organization of parts as hereinafter described and claimed; and in order that it may be fully understood, reference is to be had to the accompanying drawings, in which—

Figure 2 is a central longitudinal section of the machine and pipe but with parts of the former in elevation, the section otherwise being on the line II—II of Figure 3, the frame appearing as expanded and engaged with the interior wall of the pipe and the roller assembly adjusted out of axial alinement with the pipe.

Figure 5 is a central section of one of a pair of members adjustable on the sides of the frame for disposing under pressure, the roller assembly out of axial alinement with the pipe to be bent.

Figure 6 is a section of one side of the frame, taken on the line VI—VI of Figure 1.

Figure 9 is a fragmentary sectional view on the line IX—IX of Figure 10, of a modification of the roller assembly construction.

Figure 1:
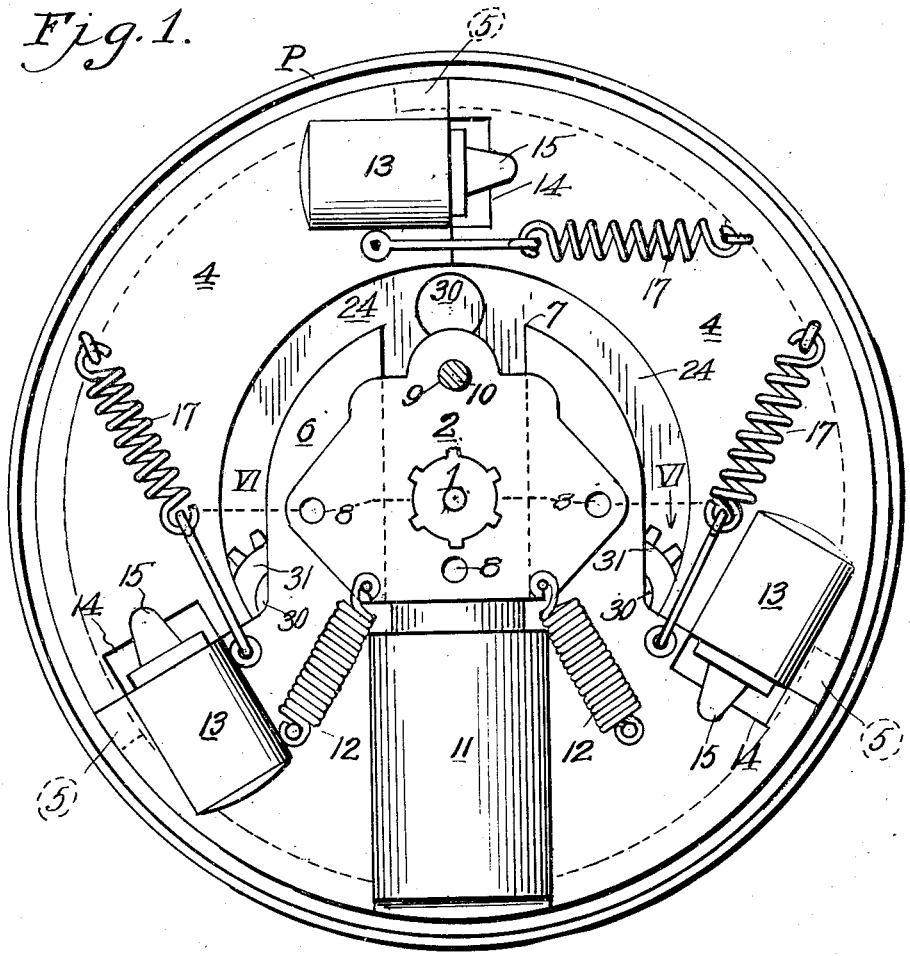
Figure 1 is an end view of a pipe to be bent, containing a bending machine embodying the invention, fitted loosely in the pipe preparatory to being clamped firmly in place by diametric expansion of the frame of the machine, the axes of the machine and pipe being in alinement.
Figure 4:
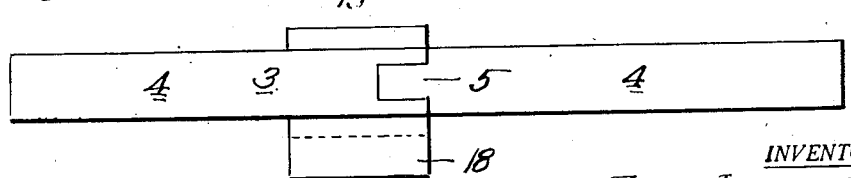
Figure 4 is an edge view of one side of the frame of the machine to disclose the slidable tongue and groove relation forming the sides, certain equipment of the side being omitted as more clearly disclosed in Figure 1.
Figure 7:
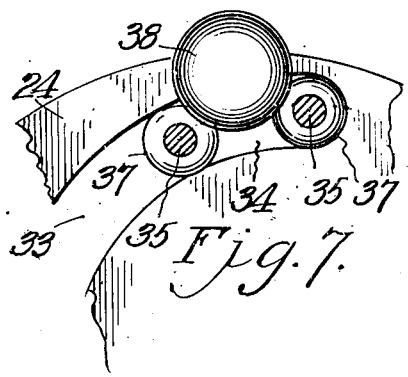
Figure 7 is a central longitudinal section of one of the roller assembly carriages and part of one of the collars having an arcuate slot as a guide for the carriage in its outward and inward travel relation to the pipe, preliminary to adjustment of the roller assembly out of axial alinement with or inward toward alinement with the pipe.
Figure 8:
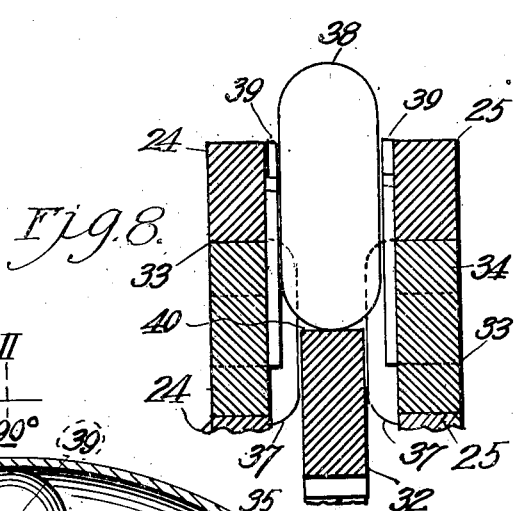
Figure 8 is an enlarged fragmentary section taken crosswise of a roller assembly carriage forming mounts for the carriage.

Figure 10 is a section on the line X—X of Figure 9, looking toward the rear end of a carriage and rear edge of the cam lobe disclosed by Figure 9, for imparting travel to the carriage, the view also showing the collars forming the mount for the carriage, as provided with radial guide slots, one of the collars being sectioned on a radial line to disclose its slot and carriage guide rolls engaging said slot.

Figure 11 is a diagrammatic view showing an arrangement of electric and fluid pressure systems for use in connection with the machine.

Referring first to the detail construction of the machine as disclosed in Figures 1 through 9, corresponding parts are indicated by similar reference characters in all of said figures, a non-rotatable shaft I connects and is rigidly fastened to a pair of similar parallel members 2 radially movable within the sides of a circular frame 3 for fitting within and clamping upon the inner wall of a pipe P, to be bent. As power is applied at both sides of the frame to move the roller assembly hereinafter identified, outwardly in a single radial direction, the shaft I may have a through passage or bore (Figure 9) for the passage of fluid under pressure from one side of the machine to the other.

Each side of the frame is composed of three segments 4 of equal length, tongue and grooved at their ends as at 5. The frame is expansible so that when within a pipe to be bent, it can be caused to expand until firmly clamped in the I. D. of the pipe and the tongue and groove connections hold the segments against independent lateral movement. Corresponding single segments of two sides of the frame, each have a radial extension 6 occupying the space between the other segments of the same side, and said extensions are provided with central radial slots 7. The respective members 2 are mounted on said extensions and have parallel grooves receiving slidably the opposite marginal edges of said slots, the arrangement constituting guides to insure direct radial movement of the members 2 for a purpose which is hereinafter explained. One of the members 2 has a series of holes 8 at convenient points for bolting a motor (shown only in Figure 12) to said member, and a hole 9 for a shaft 10 of, or driven by, the motor, to operate a beading roller assembly, as hereinafter appears. The members 2 bear against the pistons of hydraulic or equivalent cylinders 11 in radial alinement with the slots of the related segments 4, and said cylinders are formed integrally with or otherwise rigidly secured to the adjacent segments 4 provided with the slotted or bifurcated extensions. Retractile springs 12 connect the members 2 with the segments 4 equipped with the cylinders 11, to be tensioned by movement imparted to members 2 by the pistons of said cylinders 11, for the purpose of restoring said members to their initial position when power for advancing the pistons is released.

To expand the frame, each segment 4 is formed or otherwise provided with an hydraulic cylinder 13 at one end and a notch or opening 14 at its opposite end, the piston of each cylinder 13 projecting into the opposing notches 14 of another segment, and terminating in a fork 15 fitting on the notched end and cooperating with the tongue and grooved connections in holding the segments properly together. The arrangement is such that fluid under pressure supplied to said cylinders causes the pistons to advance and effect diametric expansion of the frame for clamping firmly upon the I. D. of the pipe. Springs 17 connect adjacent segments to return them to original relation when the pressure is relieved in the cylinders 13. The inner marginal faces of the segments 4, adjacent the cylinders 13, are flanged inward as at 18 (Figure 2), and occupy the same plane as the corresponding faces of the cylinders 11, and in effect constitute guides for a roller assembly journaled within the frame upon the non-rotatable shaft 1.

Figure 3:
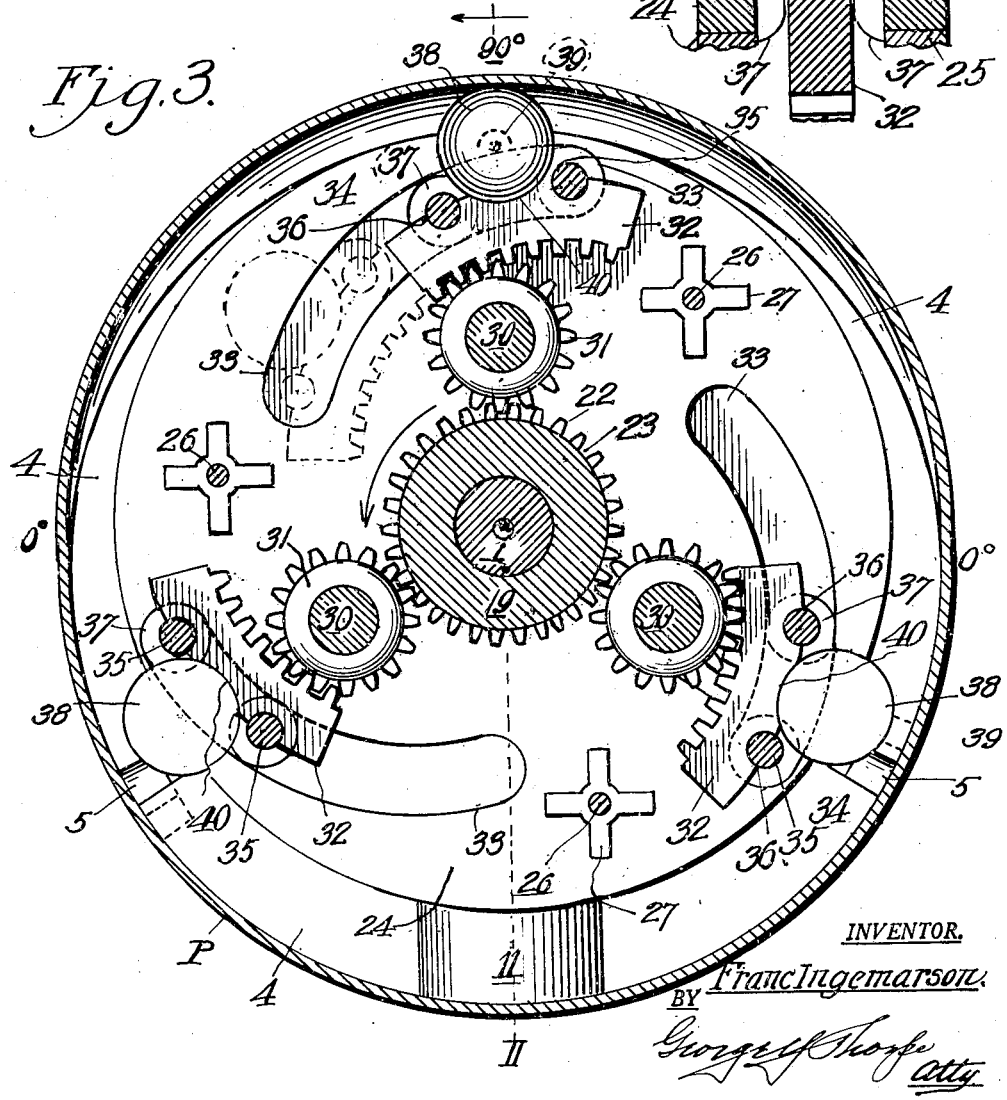
Figure 3 is an irregular section taken crosswise of the pipe and machine on the line III—III of Figure 2, but with the near side of the carriages in elevation and with the frame of the machine expanded and in clamped relation with the pipe and the roller assembly adjusted to maximum diameter, one of the carriages being shown in dotted lines in the initial position of all of the carriages.

The roller assembly as disclosed by Figures 2 and 3, is constructed as follows: A hub 19 rotatable on shaft 1 snugly between the members 2, terminates in diametrically-reduced ends of which one constitutes a gear wheel 20, the other being threaded as at 21. The hub between such ends is in the form of a relatively large gear wheel 22 and at one side thereof, is a circular rib 23 of slightly greater diameter than gear 22.

Journaled on the hub is a pair of relatively large collars 24 and 25, fastened together by cross pins 26 (Figure 3) carrying spacers 27 to prevent inward or approaching movement by said collars. The collars are identical other than one has a central opening large enough to pass over the gear 22 for convenience of assemblage. A collar 28 loose, if desired, on the threaded end of the hub as shown, is held in overlapping relation to the collars 25 by a nut 29.

Three equidistant shafts 30 are disposed around the hub gear 22 and journaled in the collars 24—25, and are provided with gear wheels 31 in mesh with the hub gear 22 and gear segments 32 disposed eccentrically relative to the axis of the collars. All of said gear segments 32 are similar and extend similarly with respect to the gears 31 with which they are respectively intermeshed. They fit and are endwise movable within carriages slidable in slots 33 of the same curvature in the collars 24—25, but are of less length.

The carriages comprise sides 34 connected by parallel cross pins 35 and the cross pins are in journaled relation with spaced notches 36 in the outer edges of the related gear segments 32 and hold the latter against disconnection from the gear wheels 31. The cross pins 35 of the carriages are provided with four journaled rolls 37 which overlap and engage opposite sides of a pressure roller 38 mounted in centering brackets 39 projecting outward from said carriages. The gear segments have cavities 40 to accommodate the rollers 38 between the rolls 37, which apply pressure outward on the respective rollers 38 in the pipe beading operation. Incidentally the relatively weak centering or axial bearings 39 for the pressure rollers 38 are relieved by rolls 37 for withstanding the force or resistance offered by the pipe as it is being grooved or beaded as the pressure developed is transmitted between the rolls 37 and roller 38, and the centering bearings 39 merely restrain the rollers from shifting out of proper centralized relation to the four rolls 37 of the related carriage. To revolve the roller assembly, the gear pinion 41 on shaft 10 driven by the motor is intergeared with gear 20 on the roller assembly hub.

The frame of the machine is of size to be fitted loosely within the pipe to be bent, and the roller assembly is designed so that the beading rollers 38 travel in a circle of substantially the I. D. of the pipe, when the roller assembly is fully expanded, but with such beading roller assembly initially in its retracted condition (see dotted lines Figures 3), so as not to interfere with the positioning of the machine within a pipe. When so positioned, with the beading roller assembly coaxial with the retracted frame, it will be apparent that the axial center of the machine will be slightly below the axial center of the pipe because the former will be resting on the lower side of the pipe. When in this position, the hand valve 50 (Figure 11) is opened to permit fluid under pressure to enter the cylinders 13 and advance their pistons to expand the frame into clamped relation with the I. D. of the pipe. This operation, at the same time, alines or centers the entire machine in relation to the axis of the pipe.

After expansion of the frame into fixed relation with the pipe, the switch 43 is closed to start the motor, the switch being set to rotate the roller assembly in the proper direction to cause rotation to move the carriers outwardly until the pressure rollers thereof contact the pipe wall. The instant the roller carriages attain their limit of outward travel in slots 33, the entire assembly commences to rotate. The completion of the electric circuit by closing the manual switch 43 incidentally effects opening of the solenoid valve 45 to permit fluid under pressure to enter cylinders 11 and through their operation of members 2, start the axial off-setting of the roller assembly relative to the alined axes of the pipe and frame.

The resultant operation of the rapid rotation and shifting of the rotative center, is to cause the rollers to roll on and outwardly bead the wall of the pipe in an arc of 180° of the circumference of the pipe, such bead having its maximum depth in direct alinement with the radial outward shifting of the center of rotation, the bead decreasing in both directions from maximum depth to zero depth at diametrically opposite sides of the pipe. This beading operation shortens one wall of the pipe with the result that the pipe automatically bends or bows toward the shortened wall. The depth of the bead is regulated by the distance the center of rotation is shifted by pressure within the cylinders 11. If the pipe bend is not sharp enough as a result of a single beading operation, it will be apparent that the entire assembly may be shifted to form a second bead, etc., until a bend of the desired angle is attained.

Referring now to the diagrammatic view, Figure 12, 42 is a suitable motor, such as a single phase reversible, controlled by a reversing switch 43 in circuit with a power line controlled by a master switch 43a. Connected in parallel with the motor ahead of the reversing switch 43 is a solenoid 44 for operating a slide valve 45 within a valve casing 46, energization of said solenoid holding the valve in open position.

In said diagrammatic view a conventional source 48 of fluid under pressure is shown, connected by high and low pressure lines to a slide valve 50, said slide valve being capable of manual adjustment by a lever 50a to place either the high or low pressure lines in communication with a hydraulic feed line 51 leading directly to the cylinders 13. Connected to the line 51 is a branch line 47 leading to the solenoid operated valve 45 which controls admission of fluid under pressure to the cylinders 11. In this connection it is to be understood that one of the cylinders 13 and one of the sets of three cylinders 11 are fed fluid through a bore or passageway (Figures 1, 3 and 9) in the non-rotatable shaft 1, as heretofore mentioned. This is done merely to avoid having feed lines entering both ends of the pipe P to be beaded or bent.

Assuming the machine to be within a pipe, the valve 50 will be set to supply pressure from the high side of the power unit to the cylinders 13, to expand and thereby clamp the frame firmly within the pipe. The switch 43, having been placed in the proper position for rotation of the motor in the desired direction, the operator next closes the master control switch 43a to energize the circuits and effect outward movement of the carriages 34 and revolution of collars 24—25 by operation of the motor, and simultaneously energize the solenoid to open the valve 45 to permit fluid under pressure to flow to the cylinders 11 to start the outward shifting of the center of rotation of the beading roller carriages.

When the bead is completed and the machine is to be shifted for the formation of another bead or is to be removed from the pipe, the reversing switch 43 is operated to reverse the rotation of the motor and retract the carriages to withdraw the beading rollers inward on the collars to their initial or starting points. In the operation of the structure it is to be understood that the inertia of the collar assembly is greater than that of the roller assembly, consequently the beading rollers contact the pipe, that is the carriages attain their limit of travel, before movement is imparted to the collar assembly.

When the beading rollers have been returned to their retracted position, the valve 50 is operated to place the feed line 51 in communication with the low side of the power source, which immediately exhausts all of the cylinders, thus returning the rotatable collars and beading roller carriages until their rotative center again substantially coincides with the axis of the pipe with no roller projecting into the bead, and at the same time by exhausting the cylinders 11 relieves the clamping pressure of the frame on the pipe to permit the springs 17 to retract the expanded frame, so that the machine can be withdrawn from or shifted within the pipe. It is to be noted that the solenoid must be energized to hold the valve 46 open during the release of pressure, or said valve may be held open in any other suitable way.

The diagrammatic representation is applicable also to the modified form of the machine disclosed fragmentally by Figures 9 and 10. In the modified form, the collars 24—25 have guide slots 52 for the rollers 53 of the carriages of the roller assembly, which slots are radial instead of arcuate, and instead of utilizing gear wheels 22, 31 and curved rack bars 32 to move the carriages, a cam is journaled on shaft 1 and has three lobes 54. Each lobe engages a bifurcation 34a of a carriage 34, only one carriage appearing in the modified form. The cam may be revolved by the motor in the manner disclosed by Figure 2 by forming the cam hub with a gear wheel (not shown) enmeshed with the pinion 41 as in Figure 2, the lobes engaging the carriages as shown in Figures 9 and 10 to force them outwardly. After this movement is accomplished the collars revolve and cause the rollers to form the external bead. The reversal of the motor and hence of the cam causes each carriage to move inwardly and the roller assembly to return to its coaxial relation with the pipe and frame.

From the foregoing description and drawings it will be apparent that the machine may be modified in various respects without departing from the spirit and scope of the appended claims.

I claim:

1. A pipe bending machine comprising a frame for fitting within a pipe to be bent, means for expanding the frame to cause it to clamp rigidly against the inner wall of the pipe, a revoluble roller assembly carried by said frame, and means to shift the roller assembly outward to form an exterior bead in the pipe wall.

2. A pipe bending machine comprising a frame composed of segments of a circle connected together for endwise movement, means to effect expansion or contraction of said segments for clamping engagement with a pipe, a revoluble roller assembly carried by the frame, a motor, means actuated by the motor for expanding the roller assembly and for revolving the same within the pipe, and means for bodily shifting the rotating assembly outwardly in the frame in relation to the axis of the pipe.

3. A pipe bending machine comprising a circular frame composed of spaced parallel sides of circular contour, for fitting within a pipe to be bent, means for expanding the sides into clamping relation with the inner wall of the pipe, a pair of members within and in slidable relation with the respective sides of the frame, a non-rotatable shaft connecting said members, a roller assembly between said sides and journaled on said shaft, a motor, means actuated thereby to expand and revolve the roller assembly until it describes a circle corresponding to the I. D. of the pipe, and means for applying power to shift the shaft-connected members and the roller assembly outward in relation to the axis of the pipe.

4. A pipe bending machine comprising a circular frame composed of spaced parallel sides of circular contour for fitting within a pipe to be bent, means for expanding the sides into clamping relation with the inner wall of the pipe, a pair of members within and in slidable relation with the respective sides of the frame, a non-rotatable shaft connecting said means, a roller assembly between said sides and journaled on said shaft, a motor, means actuated thereby to expand and revolve the roller assembly until it describes a circle corresponding to the I. D. of the pipe, means for applying power to shift the shaft-connected members and the roller assembly outward in relation to the axis of the pipe, and means for reversing the rotation of the motor to reduce the diameter and reverse the rotation of the roller assembly.

5. A pipe bending machine comprising a circular frame composed of spaced parallel sides of circular contour, for fitting within a pipe to be bent, means for expanding the sides into clamping engagement with the inner wall of the pipe, a pair of members within and in slidable relation with the respective sides of the frame, a non-rotatable shaft connecting said members, a roller assembly between said sides and journaled on said shaft, a motor, means actuated thereby to expand and revolve the roller assembly until it describes a circle corresponding to the I. D. of the pipe, means for applying power to shift the shaft-connected members and the roller assembly outward in relation to the axis of the pipe, and means for reversing the rotation of the motor to reduce the diameter and reverse the rotation of the roller assembly and frame of the machine.

6. In a pipe bending machine, a revolvable roller assembly comprising a pair of connected collars having opposite guide slots, a carriage movable outward toward and inward from the perimeter of said collars in the guide slots, a set of four rolls disposed in rectangular relation and journaled on said carriage, a pressure roller at the outer side of and resting against said rolls, and centering bearings for the pressure roller projecting from said carriage.

7. In a pipe bending machine, a circular frame comprising spaced sides composed each of a plurality of segments slidably connected together at their ends for outward expansion into clamping engagement with a pipe bore, a pair of members mounted for slidable movement in a single radial direction upon corresponding segments of said sides, a non-rotatable shaft rigidly connecting said members, and means for off-setting said shaft axially relative to said circular frame.

8. In a pipe bending machine, a circular frame comprising spaced sides composed each of a plurality of segments slidably connected together at their ends for outward expansion into clamping engagement with a pipe bore, a pair of members mounted for slidable movement in a single radial direction upon corresponding segments of said sides, a non-rotatable shaft rigidly connecting said members, means for off-setting said shaft axially relative to said circular frame, and retractile springs connecting said members with said frame for returning the shaft to coaxial relation with said frame.

9. In a pipe bending machine, a circular frame comprising spaced sides composed each of a plurality of segments slidably connected together at their ends for outward expansion into clamping engagement with a pipe bore, a pair of members mounted for slidable movement in a single radial direction upon corresponding segments of said sides, a non-rotatable shaft rigidly connecting said members, and hydraulic cylinders bearing against said members for imparting movement thereto in a single radial direction for off-setting the axis of said shaft relative to that of the circular frame.

10. In a pipe bending machine, a circular frame comprising spaced sides composed each of a plurality of segments slidably connected together at their ends for outward expansion into clamping engagement with a pipe bore, an electric motor carried by said frame, a series of pipe bending rollers bearing a journaled relation to the frame and revolved by said motor within the pipe bore, hydraulic means for shifting the center of roller rotation outwardly in relation to the pipe, and electrically operated means for insuring energization of the motor concurrently with operation of said hydraulic shifting means.

FRANC INGEMARSON.

REFERENCES CITED

The following references are of record in the file of this patent:

UNITED STATES PATENTS

| Number | Name | Date |
|---|---|---|
| 128,781 | Bell | July 9, 1872 |
| 1,846,437 | Pippin | Feb. 23, 1932 |
| 1,910,652 | Taylor | May 23, 1933 |
| 2,402,490 | Farrar | June 18, 1946 |

FOREIGN PATENTS

| Number | Country | Date |
|---|---|---|
| 473,853 | Germany | Mar. 22, 1929 |